Patented Nov. 10, 1953

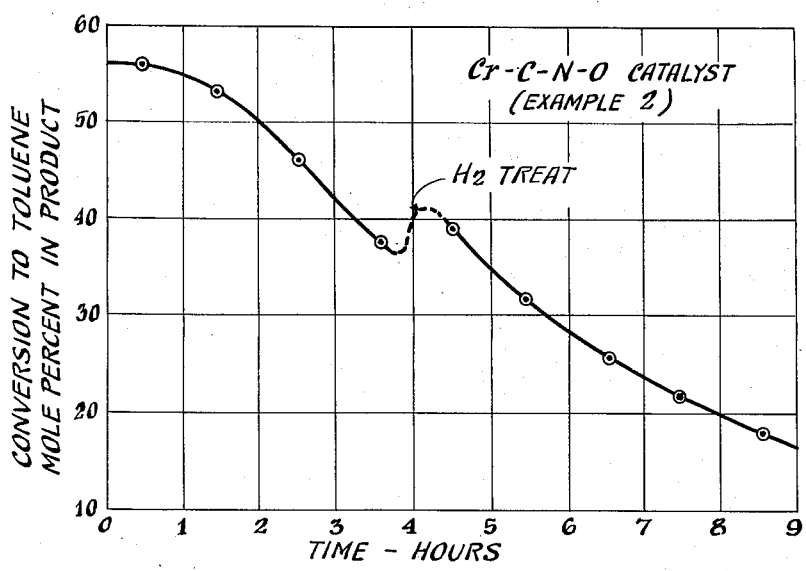
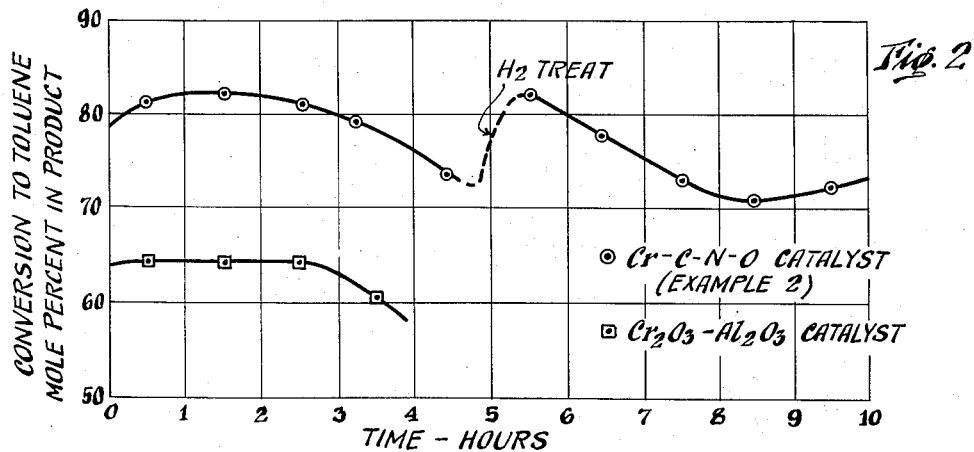
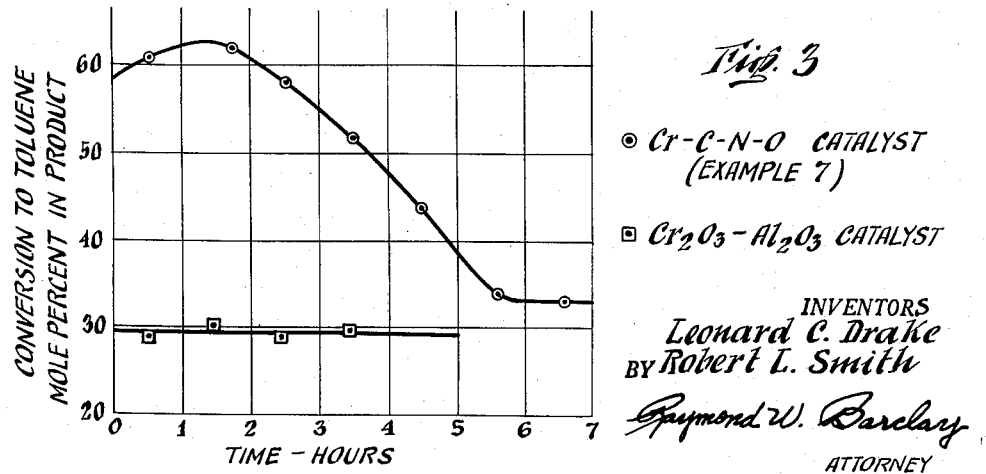

2,658,931

UNITED STATES PATENT OFFICE 2,658,931

REFORMING CATALYST AND METHOD FOR PREPARING THE SAME

Leonard C. Drake, Wenonah, and Robert L. Smith, Pitman, N. J., assignors to Socony-Vacuum Oil Company, Incorporated, a corporation of New York Application June 12, 1952, Serial No. 293,132

11 Claims. (Cl. 260—668)

This invention relates to an improved reforming catalyst and to a method for preparing the same. More particularly, the present invention is directed to a process for reforming petroleum hydrocarbons in the presence of a catalyst containing chromium, carbon, nitrogen, and oxygen combined in the form which results upon thermal decomposition and water extraction of an alkali metal chromicyanide.

Reforming operations wherein saturated gasoline fractions comprising straight run gasolines, natural gasolines, etc. are treated to improve the anti-knock characteristics thereof are well known in the petroleum industry. Straight run gasolines generally contain naphthenic hydrocarbons, particularly cyclohexane compounds, and paraffinic hydrocarbons which are usually of straight chain or slightly branched chain structure, as well as varying proportions of aromatic hydrocarbons. During reforming, a multitude of reactions take place including isomerization, dehydrogenation, cyclization, etc., to yield a product of increased aromatic content. Thus, in reforming, it is desired to dehydrogenate the naphthenic hydrocarbons to produce aromatics and to cyclicize the straight chain paraffinic hydrocarbons to form aromatics, thereby increasing the octane number of the resulting stock.

Many different catalysts have been proposed for reactions of the above type. Thus, alumina, natural clay, kieselguhr, silica gel, silica-alumina gel, or other supports with relatively porous structures and appreciable surfaces have been impregnated with various oxides of metals of groups V, VI and VII or transition group elements. Co-precipitated or co-gelled composites containing one or more of the above metal oxides have also been employed as reforming catalysts. Probably, the most widely studied catalysts have comprised various intimate mixtures of chromia and alumina, such as activated bauxite impregnated with $Cr_2O_3$, co-precipitated composites of chromia and alumina, and so-gelled chromia-alumina composites.

In accordance with the present invention, an improved catalyst has been discovered having a somewhat greater reforming activity than co-gelled chromia-alumina composites heretofore proposed for commercial reforming operations. Broadly, the instant invention comprises the provision of a reforming catalyst consisting essentially of chromium, carbon, nitrogen, and oxygen combined in the form which results upon thermal decomposition and subsequent water extraction of an alkali metal chromicyanide. The invention further comprises a method for producing the catalyst and the use thereof in catalyzing the reforming of light petroleum fractions, particularly those hydrocarbon fractions containing a substantial proportion of compounds having chains of six or more carbon atoms to increase the aromatic content thereof.

The present method of catalyst preparation involves thermal decomposition of an alkali metal chromicyanide in the absence of oxygen and subsequent extraction or leaching of the product of decomposition with water. The resultant material has been found to have a high surface area and to be an active catalyst in the reforming of light hydrocarbons. The material is of a complex nature and contains chromium, nitrogen, carbon, and oxygen. The exact structural configuration in which these elements are combined is not known with certainty. X-ray examination of the material has shown the presence of gamma-CrN. The manner of introduction of oxygen into the material is not fully understood. It appears, however, that it is introduced during contact of the decomposed product with water, while water-soluble compounds are being extracted from such product. Gas removed from the resulting dried catalyst by evacuation in the 700–1000° F. temperature range consisted of $CO_2$, CO, $N_2$ and $H_2$, while at 1400–1600° F., the gaseous evolution was principally $N_2$ with a little CO and $H_2$. These data, together with the positive X-ray identification of gamma-CrN and the chemical analyses, show that a substantial amount of nitrogen is present in the complex.

Instead of preparing and isolating an alkali metal chromicyanide, it has further been found that mixtures of a chromic salt and alkali metal cyanide may be heated together to decomposition temperature and the decomposed product thereafter extracted with water. It would appear that the alkali metal chromicyanide is formed in situ by such process. The particular chromic salt used in such method of preparation is one having an anion which upon combination with an alkali metal will form a water-soluble salt. Thus, the chromic salts of mineral acids may suitably be employed, such as chromic chloride, chromic sulfate, and chromic nitrate. Other salts of chromium falling within the above category may also be used. The particular choice of chromic salt will depend largely upon economic factors, and generally a readily available, relatively inexpensive salt will be used. The proportion of chromic salt and alkali metal cyanide combined is such as to form an alkali metal chromicyanide. Generally the mole ratio of chromic salt to alkali metal cyanide will be in the range of 1 to 6. The mixture is preferably but not necessarily prepared as an aqueous slurry.

The alkali metal chromicyanide or mixture of chromic salt and alkali metal cyanide is heated to decomposition temperature in the absence of oxygen and held at such temperature for a period of time sufficient to insure decomposition. The temperature of decomposition will, of course, depend upon the particular alkali metal chromicyanide or mixture of chromic salt and alkali metal cyanide employed but is generally in the range of about 800° F. to about 1400° F. As a general rule, temperatures in excess of about 1400° F. are to be avoided since they lead to products of decreased surface area. The time during which such temperature is maintained is ordinarily between about ¼ and about 5 hours, it being understood that such times will be sufficient to accomplish decomposition of the alkali metal chromicyanide.

It is necessary that the decomposition be carried out in the absence of oxygen. Thus, the decomposition may be effected in the presence of an inert gas such as helium, argon, etc., or in the presence of a reducing gas such as hydrogen or carbon monoxide, or in the presence of nitrogen or under reduced pressures approaching vacuum, i. e. at a pressure of about one millimeter of mercury or less. It is important for success of the instant method of catalyst preparation that no oxygen gas be present. The material resulting from the above-described decomposition is characterized by a relatively high surface area and high catalytic activity in the reforming of petroleum hydrocarbons.

The following examples will serve to illustrate the invention without limiting the same:

Example 1

A sample of crystalline $K_3Cr(CN)_6$ was prepared by mixing aqueous solutions of $CrCl_3 \cdot 6H_2O$ (102.4 grams in 300 cc. of $H_2O$) and KCN (150 grams in 600 cc. of $H_2O$) and agitating the mixture for ½ hour. The resultant material was filtered and the filtrate was boiled until it was about ¾ of its original volume. Three volumes of an alcohol mixture consisting of 90 volume per cent ethanol and 10 volume per cent methanol were added to lower the solubility. The mixture was cooled and the crude product filtered. The tan-colored residue was dissolved in a minimum of water, filtered, and 3-4 volumes of the above indicated alcohol mixture was added to the filtrate. This mixture was cooled and the precipitate present was removed by filtration. The residue was evacuated to remove residual solvent, after which 74 grams of potassium chromicyanide remained, corresponding to a 59% yield based on the chromic salt charged.

Fifty grams of the potassium chromicyanide so prepared were heated to 1000° F. in a hydrogen atmosphere and held there for 2.5 hours. A yield of 7.9 grams of a black powder having a surface area of 133 square meters per gram was obtained. Chemical analysis of this product showed that it contained by weight approximately 70 per cent Cr, 11 per cent C, 10 per cent N, 6 per cent O, 0.5 per cent K, and 1.5 per cent volatile material.

The product was tested as a dehydrocyclization catalyst employing a charge of n-heptane at a space rate of 3 volumes of n-heptane per hour per volume of catalyst and a temperature of 900° F. and a pressure of one atmosphere. The catalyst was subjected to preliminary treatment at 900° F. for 0.5 hour with hydrogen before the run. A conversion to toluene of 46 mole per cent resulted.

Example 2

A mixture of 900 grams KCN and 615 grams of $CrCl_3 \cdot 6H_2O$ was mixed with water to form a slurry at room temperature. Some gas was evolved and the mixture became gray. The slurry was dried with hydrogen passing through (air excluded) and the temperature gradually raised to 1040° F. with hydrogen passing through for 2½ hours, during which time water was removed. After cooling to room temperature in the presence of hydrogen, the product was water-washed to remove KCN and then pelleted. The pellets were then dried by passing hydrogen over them for one hour at 1025° F. The surface area of these pellets was 187 sq. meters per gram. X-ray analysis showed the product to contain gamma-CrN. The product upon chemical analysis, deemed accurate within experimental error to ±2 per cent, was found to contain 58 per cent Cr, 6 per cent C, 27 per cent O, 5 per cent N, 5 per cent K and 1 per cent volatile material.

The material was exceptionally catalytically active for the dehydrocyclization of n-heptane, having an initial activity almost twice as great as that shown by a commercial chromia-alumina (30 per cent $Cr_2O_3$-70 per cent $Al_2O_3$) reforming catalyst. Testing of the catalyst was carried out by a preliminary treatment with hydrogen for 0.5 hour at 900° F. and thereafter passing n-heptane over the catalyst at a space velocity of 1 volume of n-heptane per hour per volume of catalyst and at a pressure of one atmosphere and a temperature of 900° F. The mole per cent conversion to toluene after the first half-hour and thereafter at one-hour intervals is shown below:

| Hour | Mole Percent Toluene in Product |
| --- | --- |
| ½ | 55 |
| 1½ | 53 |
| 2½ | 46 |
| 3½ | 37 |
| Hydrogen Treat: | |
| 4½ | 39 |
| 5½ | 32 |
| 6½ | 26 |
| 7½ | 18 |

These results are presented graphically in Figure 1 of the attached drawing. At the end of 3½ hours, it will be noted that the mole per cent conversion had declined to 37. A hydrogen treat, at this point, under the reaction conditions served to increase the activity of the catalyst. The hydrogen was introduced over a period of about 30 minutes and the amount of hydrogen so introduced was about .34 mole per mole of initial n-heptane charge. As will be apparent, treatment of the reaction mixture with hydrogen at one or more intervals during the run serves to increase the overall extent of conversion and is consequently a highly desirable factor influencing the catalytic process.

The instant chromium-nitrogen-carbon-oxygen catalyst was also tested for naphthene conversion to aromatics. The test conditions were:

Charge_____ Methylcyclohexane.
Temperature_____ 932° F.
L. H. S. V._____ 1.
Pressure (hydrogen)_____ 100 p. s. i. g.
Hydrogen to hydrocarbon
  ratio_____ 5.
Time_____ 2 hrs.

The results of such test, together with results for a commercial chromia-alumina catalyst (30 per cent $Cr_2O_3$–70 per cent $Al_2O_3$) tested under identical conditions are tabulated below:

| Catalyst | Liquid | | Gas, Wt. Percent Charge |
| --- | --- | --- | --- |
| | Vol. Percent Olefins | Vol. Percent Aromatics | |
| Cr—C—N—O Catalyst (Example 2) | 1.3 | 77.7 | 7.8 |
| Chromia-Alumina Catalyst | 0.6 | 47.4 | 9.7 |

From the above data, it will be seen that the present catalyst is much more active than chromia-alumina catalyst for the dehydrogenation of methylcyclohexane, converting about 78 per cent to toluene as compared to 47 per cent for the chromia-alumina catalyst.

This enhanced activity for dehydrogenation of methylcyclohexane was also observed at atmospheric pressure. The test conditions were as follows:

Charge_____ Methylcyclohexane.
Temperature_____ 900° F.
L. H. S. V._____ 1.

The results of such test, together with results for a commercial chromia-alumina catalyst (30 per cent $Cr_2O_3$–70 per cent $Al_2O_3$) tested under identical conditions are presented graphically in Figure 2 of the attached drawing. In this case also, a hydrogen treat after the conversion had declined to a point below the initial conversion was observed to increase the activity of the catalyst, thereby affording a higher overall conversion of the methylcyclohexane charge to toluene. As will be noted, the activity of the instant catalyst was appreciably greater than chromia-alumina catalyst employed under identical reaction conditions.

Example 3

A catalyst was prepared following the procedure of Example 2 except that 678 grams of NaCN were used rather than KCN. The resulting pelleted product had a surface area of 206 square meters per gram. Chemical analysis, deemed accurate within ±2%, showed the product to contain 69 per cent Cr, 3 per cent C, 19 per cent O, 2 per cent N, and 2 per cent Na and 7 per cent volatile material.

This catalyst was tested for conversion of naphthenes to aromatics by passing methylcyclohexane over the catalyst at a liquid hourly space velocity of one, a temperature of 932° F., a hydrogen pressure of 100 p. s. i. g. for 2 hours using a hydrogen to hydrocarbon ratio of 5 to 1. The conversion of methylcyclohexane charge to toluene under such conditions was 41 per cent.

Example 4

A mixture of $CrCl_3 \cdot 6H_2O$ (10.2 grams) and KCN (15 grams) was ground together and heated without the addition of water in the presence of hydrogen for 1.5 hours at 1000° F. The product of decomposition was extracted with water until free of soluble matter. The resulting material, after drying, weighed 2.7 grams. X-ray analysis of this material showed the presence of crystalline gamma-CrN.

Example 5

A catalyst was prepared by the method of Example 1 employing $K_3Cr(CN)_6$ except that it was decomposed while evacuated to a pressure of about 0.01 millimeter of mercury rather than in a hydrogen atmosphere. The resulting material after water extraction to free the same of soluble matter was found to have a surface area of 264 sq. meters/gram, indicative of high catalytic activity.

Example 6

A catalyst was prepared by the method of Example 1 employing $K_3Cr(CN)_6$ except that it was decomposed in an atmosphere of nitrogen rather than in hydrogen. The resulting material after water extraction was found to have a surface area of 151 sq. meters/gram, indicative of high catalytic activity.

Example 7

A catalyst was prepared by the method of Example 2 employing an aqueous slurry of $CrCl_3 \cdot 6H_2O$ and KCN except that nitrogen rather than hydrogen was used as purge gas during the thermal decomposition. The resulting material, after water extraction to free the same of soluble matter, was found to have a surface area of 221 sq. meters/gram.

This catalyst was tested for dehydrocyclization activity. The test conditions were:

Charge_____ n-Heptane.
Temperature_____ 900° F.
L. H. S. V._____ 1.
Pressure_____ 1 atmosphere.

The mole per cent conversion to toluene was determined after the first half-hour and thereafter at one-hour intervals. The results were as follows:

| Time (Hours) | Mole Percent Toluene |
| --- | --- |
| ½ | 61 |
| 1½ | 62 |
| 2½ | 58 |
| 3½ | 52 |
| 4½ | 44 |
| 5½ | 33 |
| 6½ | 33 |

These results are presented graphically in Figure 3 of the attached drawing in which results obtained under identical test conditions using a commercial chromia-alumina catalyst (30 per cent $Cr_2O_3$–70 per cent $Al_2O_3$) are also shown. It is to be noted that while the activity of the chromium-nitrogen-carbon-oxygen complex catalyst increased slightly during initial conversion and thereafter decreased and finally leveled off after about 5½ hours, the activity in every instance was greater than the chromia-alumina comparison catalyst.

We claim:

1. A method of producing a reforming catalyst comprising effecting thermal decomposition of an alkali metal chromicyanide in an oxygen-free atmosphere and leaching the product of decomposition with water until free of soluble matter.

2. A method of producing a reforming catalyst comprising mixing an alkali metal cyanide with a chromic salt, the anion of which forms a substantially completely water-soluble alkali metal compound, the proportion of said alkali metal cyanide and said chromic salt being such as to form an alkali metal chromicyanide, heating the resulting mixture to decomposition temperature in the substantial absence of oxygen and contacting the product of decomposition with water until free of soluble matter.

3. A method of producing a reforming catalyst comprising mixing an alkali metal cyanide with a chromic mineral salt, the proportion of said alkali metal cyanide and said chromic salt being such as to form an alkali metal chromicyanide, heating the resulting mixture to decomposition temperature in the substantial absence of oxygen and contacting the product of decomposition with water until free of soluble matter.

4. A method of producing a reforming catalyst comprising effecting thermal decomposition of potassium chromicyanide in an oxygen-free atmosphere and leaching the product of decomposition with water until free of soluble matter.

5. A method of producing a reforming catalyst comprising mixing potassium cyanide with chromic chloride, heating the resulting mixture to decomposition temperature in the substantial absence of oxygen and contacting the product of decomposition with water until free of soluble matter.

6. A reforming catalyst consisting essentially of a major proportion of chromium and minor proportions of carbon, nitrogen and oxygen combined in the form which results upon thermal decomposition of an alkali metal chromicyanide in an oxygen-free atmosphere and extraction of the product of decomposition with water until free of soluble matter.

7. A method of producing a reforming catalyst comprising effecting thermal decomposition of sodium chromicyanide in an oxygen-free atmosphere and leaching the product of decomposition with water until free of soluble matter.

8. A method of producing a reforming catalyst comprising mixing sodium cyanide with chromic chloride, heating the resulting mixture to decomposition temperature in the substantial absence of oxygen and contacting the product of decomposition with water until free of soluble matter.

9. A process for increasing the content of aromatics in a hydrocarbon mixture, said process comprising contacting said hydrocarbon mixture with the catalyst of claim 6 under reforming conditions.

10. A process for converting n-heptane to toluene, which comprises contacting a charge of n-heptane with the catalyst of claim 6 under dehydrocyclization conditions.

11. A process for converting methylcyclohexane to toluene, which comprises contacting a charge of methylcyclohexane with the catalyst of claim 6 under reforming conditions.

LEONARD C. DRAKE.
ROBERT L. SMITH.

No references cited.